(12) United States Patent
Van Den Berg et al.

(10) Patent No.: US 9,787,410 B2
(45) Date of Patent: Oct. 10, 2017

(54) SYSTEM FOR USE IN A REVERSE POWERED REMOTE NODE AND METHOD FOR REVERSE POWERING A REMOTE NODE

(71) Applicant: ALCATEL LUCENT, Boulogne-Billancourt (FR)

(72) Inventors: Eric Van Den Berg, Nijlen (BE); Bart Hillaert, Putte (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/906,978

(22) PCT Filed: Aug. 4, 2014

(86) PCT No.: PCT/EP2014/066687
§ 371 (c)(1),
(2) Date: Jan. 22, 2016

(87) PCT Pub. No.: WO2015/018778
PCT Pub. Date: Feb. 12, 2015

(65) Prior Publication Data
US 2016/0173206 A1    Jun. 16, 2016

(30) Foreign Application Priority Data
Aug. 7, 2013   (EP) ..................................... 13306130

(51) Int. Cl.
*H04L 12/10* (2006.01)
*H04M 19/08* (2006.01)
(Continued)

(52) U.S. Cl.
CPC ........... *H04B 10/807* (2013.01); *H04L 12/10* (2013.01); *H04L 12/2898* (2013.01); *H04M 11/062* (2013.01); *H04M 19/08* (2013.01)

(58) Field of Classification Search
USPC .......................................................... 398/171
See application file for complete search history.

(56) References Cited

U.S. PATENT DOCUMENTS

| 2003/0068033 A1* | 4/2003 | Kiko ........................ H04B 3/54 379/413 |
| 2004/0027992 A1* | 2/2004 | Volkening ........... H04M 19/001 370/241 |

(Continued)

FOREIGN PATENT DOCUMENTS

| EP | 2472792 A2 | 7/2012 |
| JP | 2001-145396 A | 5/2001 |

(Continued)

OTHER PUBLICATIONS

International Search Report PCT/ISA/210 for International Application No. PCT/EP2014/066687 Dated Oct. 9, 2014.

(Continued)

*Primary Examiner* — David Payne
*Assistant Examiner* — Omar S Ismail
(74) *Attorney, Agent, or Firm* — Harness, Dickey & Pierce, P.L.C.

(57) ABSTRACT

System for use in combination with a remote node powered by a first number of lines, each line thereof being capable of providing power to the remote node in an active state of the line and not being capable of providing power to the remote node in a non-active state of the line; said system comprising: a second number of convertors; and a power control part configured for controlling the power provided by each line of said first number of lines to a converter of said second number of converters, in function of the time, depending of the states of the first number of lines.

14 Claims, 4 Drawing Sheets

(51) Int. Cl.
    *H04B 10/80*     (2013.01)
    *H04L 12/28*     (2006.01)
    *H04M 11/06*     (2006.01)

(56) References Cited

U.S. PATENT DOCUMENTS

| | | | |
|---|---|---|---|
| 2004/0230846 A1 | 11/2004 | Mancey et al. | |
| 2005/0220180 A1* | 10/2005 | Barlev | H04L 12/2856 375/222 |
| 2007/0030716 A1* | 2/2007 | Manolescu | H02M 3/157 363/84 |
| 2008/0159744 A1 | 7/2008 | Soto et al. | |
| 2012/0144214 A1* | 6/2012 | Lee | H04L 12/10 713/300 |
| 2014/0246908 A1* | 9/2014 | Chew | H02M 3/156 307/24 |
| 2014/0289273 A1* | 9/2014 | Embert | G06F 17/30017 707/770 |

FOREIGN PATENT DOCUMENTS

| | | |
|---|---|---|
| JP | 2006-237719 A | 9/2006 |
| JP | 2008-125262 A | 5/2008 |
| JP | 2012-044744 A | 3/2012 |

OTHER PUBLICATIONS

Written Opinion of the International Searching Authority PCT/ISA/237 for International Application No. PCT/EP2014/066687 Dated Oct. 9, 2014.

* cited by examiner

| | A | B | C |
|---|---|---|---|
| 1 | X | | |
| 2 | | X | |
| 3 | | | X |
| 4 | X | X | |
| 5 | | X | X |
| 6 | X | | X |
| 7 | X | X | |
| 8 | | X | X |
| 9 | X | | X |
| 10 | X | X | |
| 11 | | X | X |
| 12 | X | | X |
| 13 | X | X | X |
| 14 | X | X | X |
| 15 | X | X | X |
| 16 | X | X | X |

SYSTEM FOR USE IN A REVERSE POWERED REMOTE NODE AND METHOD FOR REVERSE POWERING A REMOTE NODE

FIELD OF INVENTION

The field of the invention relates to systems and methods for use in a remote node powered by a plurality of lines, wherein a line is capable of providing power to the remote node in an active state of the line.

BACKGROUND

The DSL market shows a rapidly growing interest in reverse power. This is a technique where a small remote node, typically a fiber-fed remote node, is not powered from a local power source, but where the remote node is powered by the CPE equipment at the active user locations. While this technique was planned to be introduced together with G. FAST, a new standard, the operators are asking to already implement the reverse power feature into VDSL nodes. Since the remote node must be operational, if even only just one subscriber line corresponding a user location is active, each subscriber line is equipped with a convertor module that is able to generate sufficient power, required for enabling this one subscriber line, i.e. for powering the line driver of this one subscriber line as well as any common parts, such as an analog front end (AFE) and a digital signal processor (DSP), and possibly some basic network processor. The convertor module takes power from the subscriber line. Once multiple users become active, i.e. turn on their CPE, the power drawn from the active subscriber lines is more or less evenly distributed across all active subscriber lines. This technique typically requires a 'medium power level' convertor on each subscriber line.

SUMMARY

The object of embodiments of the invention is to improve the powering of a remote node, and in particular to enable low cost power consumption logging in the remote node and/or to allow a fair power spreading over the subscriber lines.

According to an aspect of the invention there is provided a system for use in combination with a remote node powered by a first number of lines, each line thereof being capable of providing power to the remote node in an active state of the line and not being capable of providing power to the remote node in a non-active state of the line. The system comprises a second number of convertors, and a power control part configured for controlling the power provided by each line of said first number of lines to a converter of said second number of converters, in function of the time, depending of the states of the first number of lines.

Such a system will allow all lines to contribute to the power delivery to the remote node.

According to an embodiment there is provided a system comprising a multiplexing part capable of electrically connecting each line of said first number of lines with a DC/DC convertor of said second number of DC/DC convertors, such that each DC/DC convertor can be powered by one or more lines of said first number of lines. The power control part is further configured for controlling said connecting in function of the states of the first number of lines.

Such a system will allow choosing an appropriate number of DC/DC convertors for feeding the active components of the remote node, whilst allowing all lines to contribute to the power delivery to the remote node.

In a preferred embodiment the second number is smaller than the first number, i.e. there are provided less DC/DC convertors than lines. The multiplexing part is capable of electrically connecting each DC/DC convertors with one or more lines, and the power control part is configured for controlling the connecting depending on the states of the lines. Such a system will allow having less DC/DC convertors than lines, whilst being able to connect any line that is in an active state with a DC/DC convertor. If more lines than DC/DC convertors are in an active state, the power control part may switch between lines to balance the amount of energy that is drawn from each line. Note that, depending on the number of active lines, it may be that not all DC/DC converters need to be used, and that not all. DC/DC converters are connected to an active line even though enough active lines may be available.

In another embodiment the second number is equal to or larger than the first number, i.e. the number of DC/DC convertors is larger than or equal to the number of lines. The multiplexing part is capable of electrically connecting each line with one or more DC/DC converters, and the power control part is configured for controlling the connecting depending on the states of the lines, the amount of power required in the system, etc. Such a system will allow using more lines simultaneously for remote powering, resulting in lower power losses and less EMI. Indeed, the converters can be smaller, and a larger number of lines results in a lower combined line resistance (more lines in parallel) compared to a smaller number of lines that is being used for powering (less lines in parallel).

In yet another embodiment there are provided less DC/DC convertors than lines, and the multiplexing part is capable of electrically connecting each DC/DC convertors with a plurality of lines simultaneously, and is configured for controlling the connecting depending on the state of the lines. Also this embodiment will allow using more lines simultaneously for remote powering, resulting in lower power losses and less EMI.

According to other embodiments the power control part is capable of switching on/off each converter or of regulating/setting an amount of power converted by each converter in function of the time, depending of the states of the first number of lines. In such embodiments, typically there will be provided a converter for each line, which converter is controlled by the power control part in function of time. If a large number of lines is active, typically not all converters will be switched on. The converters may be DC/DC converters located in the remote node, or AC/DC converters located in respective, customer premises equipments associated with the first number of lines.

In a possible embodiment the first number of lines comprises digital subscriber lines. However, also other power source may be considered, such as a line that is being fed with a back-up energy source 126, e.g. solar energy, a line connected to a battery, etc. Such a back-up energy source may be used to provide extra energy e.g. to facilitate start-up when the first line becomes active (battery), or as a 'green energy' source (solar, windmill, . . . ), or to bridge micro interruptions caused by the TDM function or the users switching on/off their CPE (battery, capacitors, solar, windmill, . . . ).

In preferred exemplary embodiments, in particular suitable for use in a fiber-fed remote node that is connected to a plurality of subscribers through DSL lines, there are provided at least eight lines.

In preferred embodiments the power control part is adapted to perform time division multiplexing in function of the states of the first number of lines. Preferably, the power control part is adapted to connect a first line in an active state to a first DC/DC power convertor during a first period of time and to connect a second different line in an active state, to the first DC/DC power convertor during a second period of time following said first period of time, when said first and said second line are both active during both the first and second period of time.

In a preferred embodiment, the system comprises a first number of line drivers for driving the first number of lines, at least one analogue front end connected to the first number of line drivers, and a digital signal processor connected to the at least one analogue front end. Preferably, the second number of DC/DC convertors is connected in such a way to the at least one analogue front end, and to the digital signal processor, that power is provided to said digital signal processor, and to any analogue front that is connected to a line in the active state.

In a further developed embodiment, a power convertor module is provided between each line of the first number of lines and a supply terminal of an associated line driver of the first number of line drivers. In that way the line drivers may be powered directly by the corresponding line, using a small power convertor module.

According to another variant the system comprises detection means configured for detecting which line of said first number of lines is in an active state. The power control part may be configured for controlling the multiplexing part using the result of the detection means, and in particular for selecting from the detected line(s) in the active state, lines for connection to the DC/DC power convertors.

In a preferred embodiment the multiplexing part is configured in such a way that each DC/DC convertor of said second number of DC/DC convertors is connectable to at least two lines of said first number of lines. The power control part may then be configured in such a way that, when said at least two lines comprise at least one line that is in an active state, the DC/DC convertor is connected to one single line of said at least one line in an active state, wherein the selection of this single line may change over time. In other words, for each DC/DC convertor the power control part can choose a single line from a plurality of lines so that power is drawn from that line, and this choice may be changed over time.

According an aspect, there is provided a remote node configured for being powered by a first number of lines, each line thereof being capable of providing power to the remote node in an active state of the line and not being capable of providing power to the remote node in a non-active state of the line. The remote node comprises a power control part configured for controlling the power provided by each line of said first number of lines, in function of the time, depending of the states of the first number of lines.

According to an aspect, there is provided a CPE configured for being connected to a line for powering a remote node, in particular a remote node as disclosed above, said CPE comprising an AC/DC converter configured for being controlled by a power control part of the remote node.

According to an aspect there is provided a method for use in combination with a remote node powered by a first number of lines, each line thereof being capable of providing power to the remote node in an active state of the line and not being capable of providing power to the remote node in a non-active state of the line; said method comprising controlling the power provided by each line of said first number of lines, in function of the time, depending of the states of the first number of lines.

The method may comprise electrically connecting each line of said first number of lines with a DC/DC convertor of a second number of DC/DC convertors, and controlling said connecting in function of the time, depending of the states of the first number of lines.

The method may comprise switching on/off a second number of converters or regulating an amount of power converted by a second number of converters in function of the time, depending of the states of the first number of lines. The converters may be DC/DC converters located in the remote node or AC/DC converters located in respective customer premises equipments associated with the first number of lines.

The method may further comprise keeping track of the power that is provided by each line of the first number of lines over time.

According to another aspect of the invention there is provided a DSL node with fewer power convertors receiving reverse power than DSL lines arriving at said DSL node. These convertors are connected to a low cost switch matrix, typically less than full mesh, and a time division multiplexing scheme is used to extract a balanced amount of energy from each DSL line. Switching between different DSL lines may take place e.g. once every 15 minutes or once every couple of hours. Such a technique enables low cost power consumption logging and fair power spreading over the DSL lines.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Embodiments of the invention relate to a reverse powered remote node, in particular a digital subscriber line (DSL) node. Power is provided by a CPE 170 of a subscriber through the DSL line to the remote node, when the line is active, i.e. when the CPE 170 is on.

Figure 1:
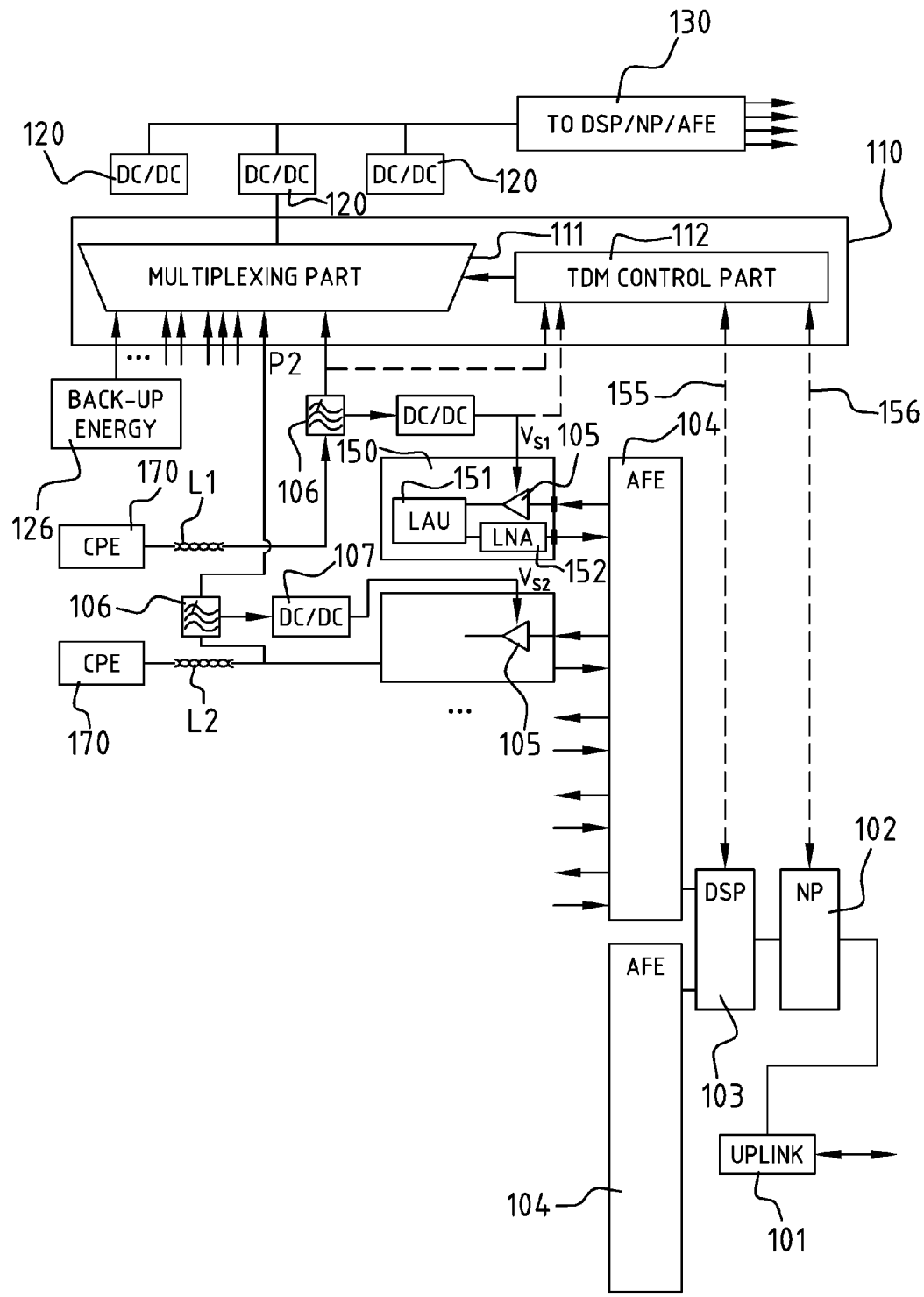
FIG. 1 illustrates schematically a first exemplary embodiment of a remote node.

Several parts need to be powered in a DSL node. FIG. 1 illustrates an example of a first embodiment of a DSL node. First the typical active components of such a DSL node will be discussed.

The DSL node comprises an uplink module 101 for transmitting and receiving traffic to and from the core of the network. Optionally additional uplinks may be provided for load sharing or redundancy. The uplink module 101 is connected to a network processor (NP) 102 configured to distribute the uplink traffic to the applicable DSL line L1, L2, etc, and optionally to provide services, such as traffic management, etc. Note that the network processor is optional, and that, instead of providing the network processor in the DSL node, there could be provided a network processor in the Central Office (CO), wherein the uplink module 101 connects the DSL node to the CO. The uplink module 101 and the optional network processor 102 are required as soon as the first DSL line L1, L2, etc becomes active. A typical network processor 102 consumes between 5 and 15 W.

The traffic from the NP 102 is processed in a digital signal processor (DSP) 103 configured for generating data carrier tones for downstream signals and for performing reverse FFT to extract the upstream data from the DSL lines L1, L2, etc. In present systems a DSP 103 typically services sixteen VDSL lines. The DSP 103 is required to be powered once the first DSL line L1 becomes active. A DSP 103 typically consumes between 1 W and 10 W depending on the number of active DSL lines L1, L2, etc.

Between the DSP 103 and the DSL lines L1, L2, etc, there is provided an analog front end (AFE) 104 with a digital-to-analog convertor (DAC) for generating a downstream analogue signal and an analog-to-digital convertor (ADC) for sampling the upstream analogue information, in present systems an AFE 104 typically serves eight VDSL lines L1 and consumes between 1 W to 5 W. The AFE 104 is connected to transceiver circuitry 150 comprising a line driver (LD) 105 for amplifying the transmit signal and for driving the subscriber line L1, and a low noise amplifier (LNA) 152 for amplifying a signal received from the subscriber line L1 with a low noise. The transceiver circuitry further comprises a line adaption unit (LAU) 151. The LAU 151 typically comprises a hybrid for coupling a line driver output to the subscriber line and the subscriber line to a LNA input, while achieving a low transmitter-receiver coupling ratio, and may further comprise additional filters and impedance matching circuitry. The line driver 105 amplifies the analogue signal from the DAC of the AFE 104 onto the DSL line L1. The line drivers 105 may be single channel state of the art (class-H) line drivers and typically consume between 100 mW and 1000 mW, depending on the DSL profile and line length of the DSL line L1.

Although not illustrated, the skilled person understands that there may be optional further active components, such as fans, that need to be powered.

The mentioned power figures are typical numbers, but depending on the used chip-set, i.e. depending on the vendor, generation, DSL technology, etc., significant differences may be observed.

A typical node size of a remote DSL node in which reversed powering will be deployed is a node with sixteen DSL lines, or a granular node for a multiple of sixteen DSL lines.

For the exemplary embodiment of FIG. 1, it will be assumed now that the DSL node is powered by sixteen DSL lines L1, L2, etc, wherein each line thereof is capable of providing power to the DSL node in an active state of the line (CPE 170 on) whilst not being capable of providing power to the remote node in a non-active state of the line (CPE 170 off). The system comprises three DC/DC convertors 120 for converting the power of the lines to a suitable level for feeding the different active components of the system, see 130. Note that there may also be provided more than three DC/DC convertors. However, preferably the number of lines is significantly larger than the number of DC/DC convertors. In a typical embodiment, each of the three DC/DC convertor modules 120 can provide somewhere between 10 W and 15 W, depending on the number of active lines. Taking into account the above mentioned power figures for the active components a fourth convertor module could be considered.

The remote node further comprises a power handling part 110 with a multiplexing part 111 capable of electrically connecting each line L1, L2, etc of the sixteen lines with a DC/DC convertor 120 of the three DC/DC convertors 120, such that each DC/DC convertor 120 can be powered by one or more lines L1, L2, etc. The power handing part 110 further comprises a time division multiplexing (TDM) control part 112 configured for controlling the connecting in function of the states (active/non-active) of the sixteen lines, wherein the connections can be changed in the time. In other words, preferably, the power handling part 110 performs time division multiplexing (TDM) in function of the states of the sixteen of lines. The time division multiplexing (TDM) control part may keep track of the power that is provided by the different lines over time, in order to allow an even balancing over the lines and/or in order to allow a fair billing of the subscribers.

In the exemplary embodiment the DSP 103, the optional NP 102 and the TDM control part 112 are shown as separate units, but the skilled person understand that those units may be grouped in a single unit or in two units with or without the NP functionalities. Also, the AFE 104 could be integrated with the DSP 103. Further, typically there are provided communication channels 155, 156 for exchanging data between the TDM control part 112 and the DSP 103, and optionally also between the TDM control part 112 and the NP 102. The exchanged data may be related to the power to be delivered, the power that has been delivered by each line, etc.

Figure 2:
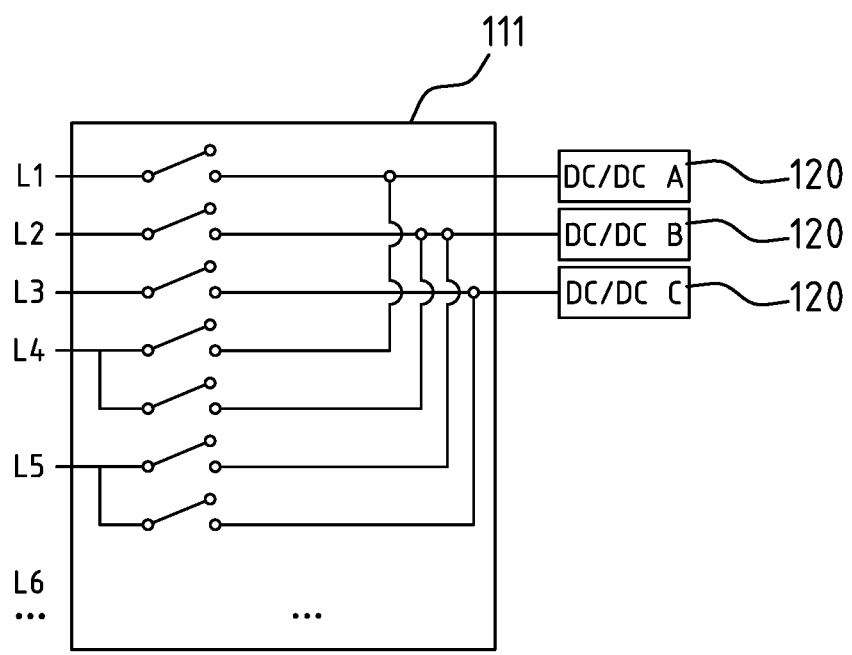
FIG. 2 illustrates schematically an example of suitable switch matrix and multiplexing part for the embodiment of FIG. 1.

An example of a suitable TDM switch matrix is illustrated in FIG. 2. The multiplexing part 111 corresponding with this matrix is also illustrated. In the example a first line L1 is connectable to DC/DC convertor A, a second line L2 is connectable to DC/DC convertor B, a third line L3 is connectable to DC/DC convertor C, a fourth line L4 is connectable to DC/DC convertor A or to DC/DC convertor B, etc. For this example each DC/DC convertor 120 is connectable to eleven lines, and, for each DC/DC convertor 120 a suitable line out of the eleven lines is selected by the TDM control unit 112, in function of, amongst other parameters, the state of the connectable lines. This is illustrated with an example. It will be assumed that, during a first time period, lines L1, L2, L6, L7, L10, and L11 are active, and that the other lines are non-active, and that, in addition L16 becomes active during a second time period. The TDM control unit may then e.g. control the connections as follows:

|  |  | A | B | C |
|---|---|---|---|---|
| 1st time period (t0->t5) | t0->t1 | L1 | L2 | L11 |
|  | t1->t2 | L7 | L10 | L6 |
|  | t2->t3 | L1 | L2 | L11 |
|  | t3->t4 | L7 | L10 | L6 |
| 2nd time period (t5->t8) | t4->t5 | L16 | L2 | L11 |
|  | t5->t6 | L16 | L10 | L6 |
|  | t6->t7 | L1 | L7 | L16 |
|  | etc |  |  |  |

In other words, during the first time period the required power may be drawn in a balanced way from the active lines L1, L2, L6, L7, L10, L11 by changing the connections between the lines and the DC/DC convertors A, B, C. In the first time period, until time t1, A is connected to L1, B to L2, and C to L11; between time t1 and t2, A is connected to L7, B to L10, and C to L6; etc. In the second time period, between time t5 and t6, A is connected to L16, B to L2, and C to L11; between time t6 and t7, A is connected to L16, B to L10, and C to L6; etc. The TDM control unit 112 may be configured to keep track of the time periods that a line is providing power to the remote node, e.g. in order to reward subscribers for providing power and/or to ensure that every subscriber provides more or less the same amount of power.

Generalizing the example above, preferably the power handling part 110 is adapted to connect a first line in an active state to a first DC/DC power convertor during a first period of time and to connect a second different line in an active state, to the first DC/DC power convertor during a second period of time following said first period of time, when said first and said second lines are both active during both the first and second period of time.

For the example given above it was assumed that more than three lines are active, and that the power to be delivered to the DSL node was provided using all three DC/DC converters. If very few lines are active only one or two convertors may be active. E.g. if only lines 1, 2, 4, 7 and 10 are active in the example above, DC/DC convertor C may not be used. This will optimize the efficiency of the system, since a DC/DC convertor efficiency may be low when it converts significantly less power than the maximum power it is designed for. E.g. if only lines 1, 2 and 3 are active in the example above, it may be chosen to only activate a single convertor: DC/DC convertor A in the first time slot, DC/DC convertor B in the second time slot, DC/DC convertor C in the third time slot, and DC/DC convertor A again in the next time slot, etc. So, more generally the power handling part 110, and in particular the TDM control unit 112, is preferably adapted to connect a suitable number of DC/DC convertors, each with a different line in the active state, in function of the required power for serving the total number of active lines.

Preferably, the DC/DC convertors 120 are connected in such a way to the AFE's 104, to the DSP 103, and to the NP 102 (schematically illustrated with reference numeral 130), that power is provided at least to the DSP 103, to the NP 102, and to one of the analogue fronts 104 or to both of the analogue front ends 104, depending on whether or not they both have lines in the active state. In an exemplary embodiment, the DSP 103 and/or the AFE 104 and/or the line driver 105 may have a switch in their power supply rail. When a line connected to a particular DSP 103, AFE 104, or line driver 105 is activated the respective switch is turned on. In another embodiment the line driver 105 and/or the AFE 104 and/or the DSP 103 may be kept in a RESET or Power Down state as long as the connected lines thereof are not active. According to a further developed embodiment a switch matrix may be inserted in between the lines and the LAU. This allows to group all active lines to a minimum number of AFE and DSP and to keep the not used AFE & DSP powered down.

Preferably, the line drivers 105 are powered only for those lines that are active. This may be achieved by putting the line drivers into a power-down state when not in use, and in providing additional functionalities for detecting an active CPE and enabling the associated line driver. According to an improved solution illustrated in FIG. 1, a very low power, and typically very low cost, compact convertor module 107 is provided between each DSL line L1, L2, etc and the associated line driver 105, for generating a supply voltage Vs1, Vs2 for the line driver 105. In other words, each line driver 105 is powered from its associated line through a power convertor module 107, and thus excluded from the power handling mechanism. When a line L1 is active, a small part of the available power is drawn away via the convertor module 107 to power the line driver, whilst the larger part P1 of the available power may be drawn by a DC/DC convertor 120 for powering the DSP 103, the NP 102 and the AFE('s) associated with an active line. Further, there is typically provided a filter 106 configured to remove transients from the signal on the line in order to obtain a clean DC signal at the input terminal of the power handling part 110. The DC/DC convertor modules 107 take a small amount of energy from the connection Lx-Px to power the line driver 105.

Although not shown, the skilled person understand that there will be provided rectifiers between the filters 106 and the
DC/DC converters 120, either before the multiplexing part 111 or after the multiplexing part 111.

The line driver supply voltage Vs1 can serve as a means to indicate to the TDM control part 112 that the line L1 is active, see line 153. In other words an active line may be detected by the presence of a line driver supply voltage generated by DC/DC convertor module 107 brought to the TDM control part 112 by interface 154. Alternatively, an input terminal of the power handling part 110 may be sensed, see line 154. In other words an active line may be detected by the presence of a voltage at the output of 106, and brought to the TDM control part 112 through interface 154, where the Line Driver is powered by 130.

Typically, the TDM control part 112 is designed in such a way that, when it is not controlled by the DSP 103 or the NP 102, e.g. when all control inputs received on interfaces 155, 156 are 'low', it will sense the line active indicators, i.e. either 153 or 154, and automatically connect at least one active line to one of the DC/DC convertors 120. Since this start-up situation occurs only for a short period of time, typically the time needed for the DSP 103 and NP 102 to take over control of the TDM control part 112, there is no need to perform 'fair balancing' during this start-up period.

More generally, in preferred embodiments there may be provided any type of detection means configured for detecting which line(s) is/are in an active state. The TDM control part 112 is configured for receiving and using this information for controlling the multiplexing part 111 in function of the detected line(s) in the active state, the amount of energy provided by the lines in the past, the provisioned bit rate in function of contract type, the trained bit rate (amount of bits per tone) in function of line length and noise, periodical download/upload volume, etc.

Embodiments of the invention allow using less DC/DC convertor modules or smaller DC/DC convertor modules, compared to prior art solutions where each line is connected to one DC/DC convertor. Convertor modules are more expensive compared to the low cost relays or solid state switches which are typically used in the power handling part.

In embodiments of the invention the convertors can operate in a region where they have the highest efficiency. This is made possible because the number of DC/DC convertors does not need to be equal to the number of lines, and the number of DC/DC convertors can be optimized in function of the required power in the remote node. In prior art solutions, in a situation where all convertors on active lines provide an evenly balanced amount of power, typically the convertors will work far below the point where they have the highest efficiency, thus wasting unnecessary power.

Moreover, in the prior art solutions, where each line has its own DC/DC convertor, the power contribution of each line will be heavily dependent on the line length resulting in unfair power contributions amongst the different users. In embodiments of the invention, this unfair treatment of users can be compensated by dimensioning the duration of the TDM slices in function of the power contribution per line instead of striving at having an equal powering time of each line.

Convertor modules are known to be one of the weakest links, i.e. the link with the highest failures in time (FIT) rate and the lowest mean time between failures (MTBF), of an electronic system. Embodiments of the invention allow adding a certain redundancy to the system. Indeed, even with a broken DC/DC convertor 120, the system remains fully functional, since another DC/DC convertor may take over. In order to ensure in the embodiment of FIG. 2 that another convertor can take over in all cases, also when there is only one line active, the switch matrix should be such that each line is connectable to at least two DC/DC convertors. In other words, for lines L1, L2, and L3 the table should be changed, so that those lines are also connectable to at least two convertors. This redundancy provides high flexibility to the operator to plan a repair action in case of a broken DC/DC convertor.

Figure 3:
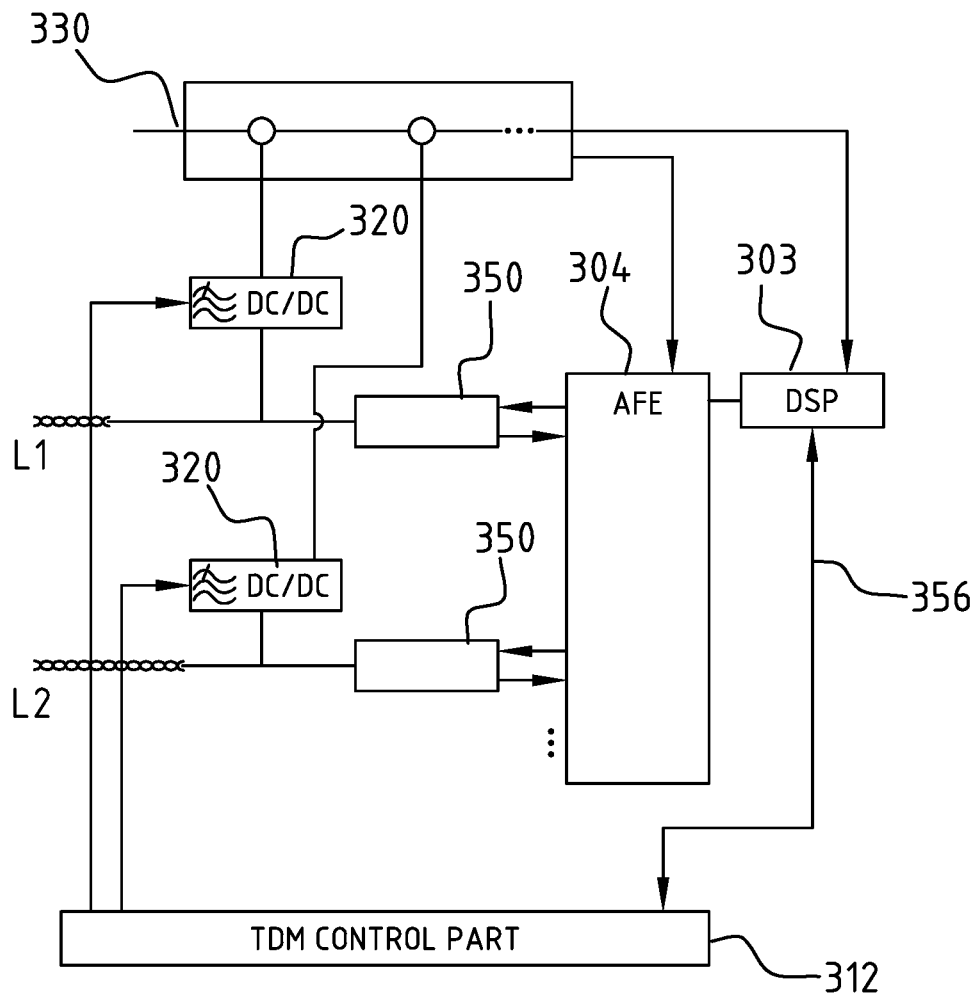
FIG. 3 illustrates schematically a second exemplary embodiment of a remote node.

FIG. 3 illustrates a second embodiment of a system of the invention. The system comprises for each line L1, L2, etc. a DC/DC convertor 320. A TDM control part 312 is provided for switching on/off the DC/DC converters 320 in function of the time and in function of the states (active/non-active, i.e. CPE on/off) of the lines L1, L2, etc. The TDM control part 312 may keep track of the power that is provided by the different lines over time, in order to allow an even balancing over the lines and/or in order to allow a fair billing of the subscribers. Preferably, the DC/DC convertors 320 are connected to a power bus 330 for providing power to the AFE 304, and the DSP 303. Components 350 and 356 are similar to components 150 and 156 described above, FIG. 4 illustrates a third embodiment of a system of the invention. The system comprises for each line L1, L2, etc. a AC/DC convertor 420 located in the CPE's 470 associated with the respective lines L1, L2, L3. A TDM control part 412 is capable of switching on/off the AC/DC converters 420 in function of the time and in function of the states (active/non-active, i.e. CPE on/off) of the lines L1, L2, etc. Alternatively the TDM control part 412 may be capable of adjusting a power level of the AC/DC converters 420 in function of the time and in function of the states (active/non-active, i.e. CPE on/off) of the lines L1, L2, etc. The control part 412 may keep track of the power that is provided by the different lines over time, in order to allow an even balancing over the lines and/or in order to allow a fair billing of the subscribers.

Figure 4:
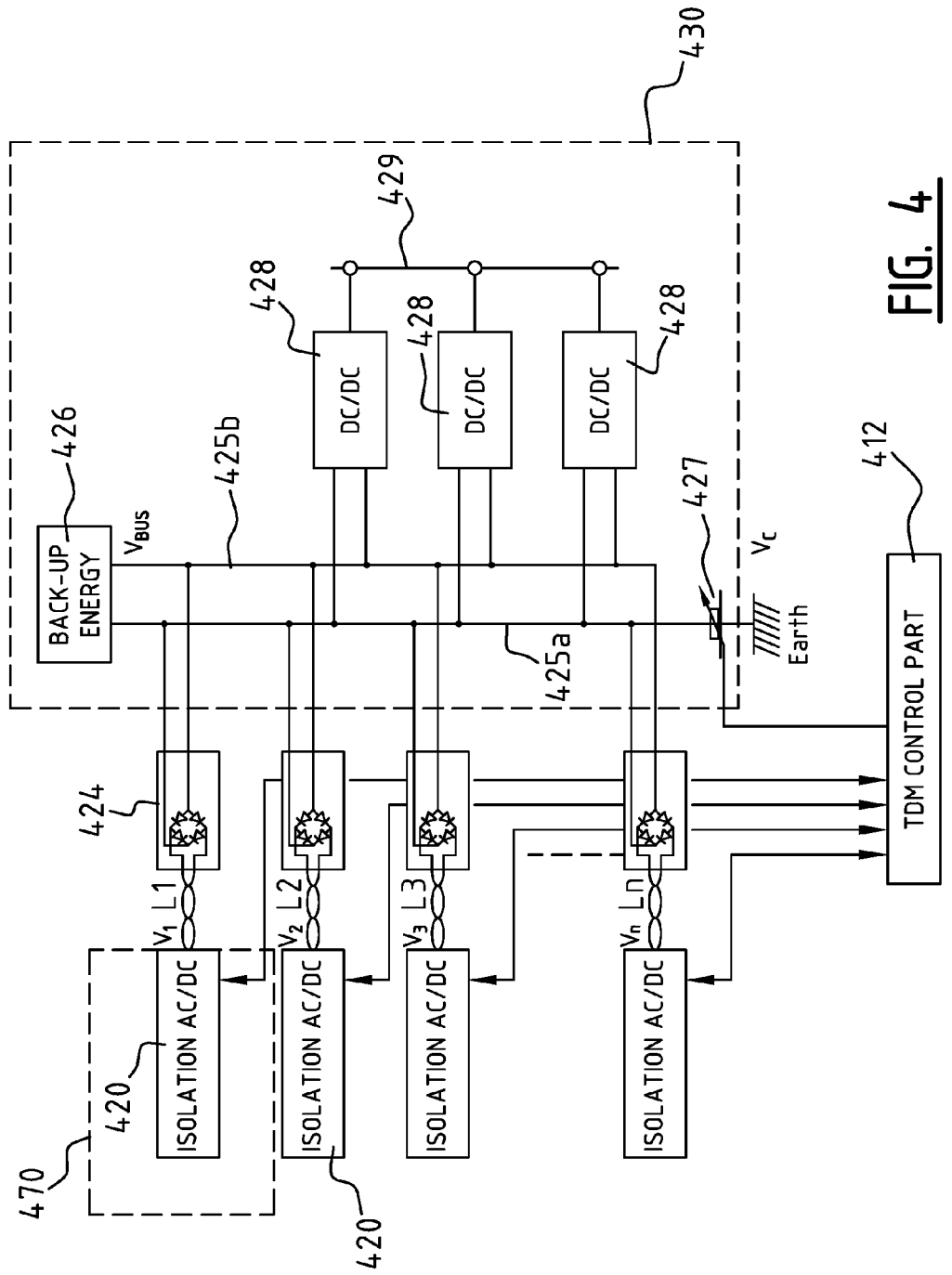
FIG. 4 illustrates schematically a third exemplary embodiment of a remote node.

For clarity reasons the transceiver circuitry, the AFE and the DSP are not shown in FIG. 4, but they may be provided in a way similar as disclosed in connection with FIG. 3. In this embodiment, the DC/DC convertors 320 are connected to a first power bus 425a, 425b, which is connected through a number of additional DC/DC converters 428 to a second power bus 429 for providing power amongst others to the AFE and the DSP. Additional DC/DC converters 428 may also be controlled by the TDM control part 412, depending on the number of active lines. In that way, if only a few lines are active not all DC/DC converter 428 need to be switched on. Similarly, depending on the number of active CPE's (i.e. the number of active lines), a suitable number of AC/DC converters 420 of the active CPE's 470 may be switched on.

The bus has a positive rail 425a and a negative rail 425b and may be connected to an optional backup energy source 426, such as a capacitor, for providing power during a short period of time, e.g. during switching between lines or when a line that is being delivering power changes into an inactive state. The bus 425a, 425b is located in the remote node and the positive rail is connected to the output of n rectifiers 424, here comprising diode bridges, connected to the n lines, respectively.

Telecom equipment is typically powered by −48 or −60V. The DC voltages V1, V2, . . . , Vn generated by the AC/DC converters 420 in the CPE's 470 are floating. The currents flowing through the twisted pairs will cause a voltage drops which depend on the loop length and the current contribution of each AC/DC convertor 420 to the powering of the remote node. Due to the voltage drop across a telephone line, a negative terminal of the source voltage V1, V2, . . . , Vn will be more negative than the negative rail 425b of the bus voltage VBUS, assuming that power is being provided over that line. Similarly, a positive terminal of the source voltage V1, V2, . . . Vn will be more positive than the positive terminal of the bus voltage VBUS, assuming that power is being provided over that line. In order to achieve that all positive terminals are negative versus earth potential, a negative DC voltage source 427 versus earth level is added on the positive rail 425a of the bus. The absolute value of this negative DC voltage may be at least (Max(V1, V2, . . . , Vn)−VBUS)/2. Notice that it is not required to know the actual voltages V1, V2, . . . Vn if the maximum voltage is known. In most countries this is either 60, or 72V. In that way it is achieved that the positive terminal of the highest voltage of V1, V2, . . . Vn is at earth level or below.

Embodiments of the invention allow introducing intelligent algorithms to distribute the cost of powering the DSL node in a well balanced fashion over all connected subscribers. Even users trying to reduce their contribution by shutting down their CPE when not in use, can be forced to contribute a fair share by connecting one of the convertor modules to their line each time those users turn their modem on. Also further algorithms may be considered e.g. giving subscribers a reduction on their monthly subscription in relation to the total energy level provided to the DSL node.

Also, embodiments of the invention allow using intelligent algorithms to smoothen the switch-over from one input to the other by first slowly reducing the power input needs of the convertor who will perform an input switchover. In other words, in typical embodiments no additional filtering features will be required to support time division multiplexing of the convertor modules versus what is required in prior art solutions.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claim.

The invention claimed is:

1. A system comprising:
a remote node configured for being powered by a plurality of lines associated with respective customer premises equipment (CPEs), said plurality of lines being a first number of lines, each line being capable of providing power to the remote node in an active state of the line and not being capable of providing power to the remote node in a non-active state of the line;
a plurality of converters, said plurality of converters being a second number of convertors;
a detection means configured for detecting which lines of said first number of lines are in the active state; and
a power control part configured for controlling the power provided by each line of said first number of lines to a converter of said second number of converters, in a function of time, by performing time division multiplexing depending on the detected active states of the first number of lines.

2. The system of claim 1, wherein the second number of converters includes a second number of DC/DC converters, said system further comprising a multiplexing part capable of electrically connecting each line of said first number of lines with a DC/DC convertor of said second number of DC/DC convertors, such that each DC/DC convertor can be powered by one or more lines of said first number of lines, said power control part being configured for controlling said connecting.

3. The system of claim 2, wherein said second number is smaller than said first number, and the multiplexing part is capable of electrically connecting each DC/DC convertors of said second number of DC/DC convertors with one or more lines of said first number of lines, said power control part being configured for controlling said connecting.

4. The system of claim 2, wherein said second number is larger than or equal to said first number, and the multiplexing part is capable of electrically connecting each line of said first number of lines with one or more DC/DC convertors of said second number of DC/DC convertors, said power control part being configured for controlling said connecting.

5. The system of claim 1, wherein said power control part is configured for switching on/off said second number of converters or for regulating an amount of power converted by said second number of converters in a function of time, depending on the detected active states of the first number of lines.

6. The system of claim 1, wherein the second number of converters includes a second number of DC/DC converters located in the remote node.

7. The system of claim 1, wherein the second number of converters includes a plurality of AC/DC converters located in respective CPEs associated with the first number of lines, each of the respective CPEs configured for being connected to a respective line of the first number of lines for powering the remote node, each AC/DC converter of the plurality of AC/DC converters configured for being controlled by said power control part.

8. The system of claim 1, wherein said first number of lines comprises a plurality of digital subscriber lines.

9. The system of claim 1, wherein the power control part is configured for tracking the power provided to the remote node by each line of the first number of lines over time.

10. The system of claim 1, wherein the system comprises a first number of line drivers for driving the first number of lines, at least one analogue front end connected to said first number of line drivers, and a digital signal processor connected to said at least one analogue front end, wherein said second number of converters includes a plurality of DC/DC convertors connected in such a way to said at least one analogue front end, and to said digital signal processor that power is provided to said digital signal processor and to any analogue front end of the at least one analogue front, that is connected to a line that is in the active state.

11. The system of claim 1, wherein the power control part is connected to the detection means.

12. A remote node configured for being powered by a plurality of lines associated with respective CPEs, said plurality of lines being a first number of lines, each line being capable of providing power to the remote node in an active state of the line and not being capable of providing power to the remote node in a non-active state of the line, said remote node comprising:
a plurality of converters, said plurality of converters being a second number of converters;
a detection means configured for detecting which lines of said first number of lines are in the active state; and
a power control part configured for controlling the power provided by each line of said first number of lines to a converter of said second number of converters, in a function of time, by performing time division multiplexing depending on the detected active states of the first number of lines.

13. A CPE configured for being connected to a line for powering the remote node according to claim 12, the line being a respective line of the first number of lines, said CPE being of the respective CPEs and including an AC/DC converter configured for being controlled by said power control part of the remote node.

14. A method for use in combination with a remote node configured for being powered by a plurality of lines associated with respective CPEs, said plurality of lines being a first number of lines, each line being capable of providing power to the remote node in an active state of the line and not being capable of providing power to the remote node in a non-active state of the line, said method comprising:
detecting which lines of said first number of lines are in the active state; and
controlling the power provided by each line of said first number of lines to a converter of a plurality of converters, said plurality of converters being a second number of converters, in a function of time, by performing time division multiplexing depending on the detected active states of the first number of lines.

\* \* \* \* \*